Dec. 26, 1944. B. G. HORSTMANN 2,365,877
JAMMING CLUTCH
Filed July 8, 1943
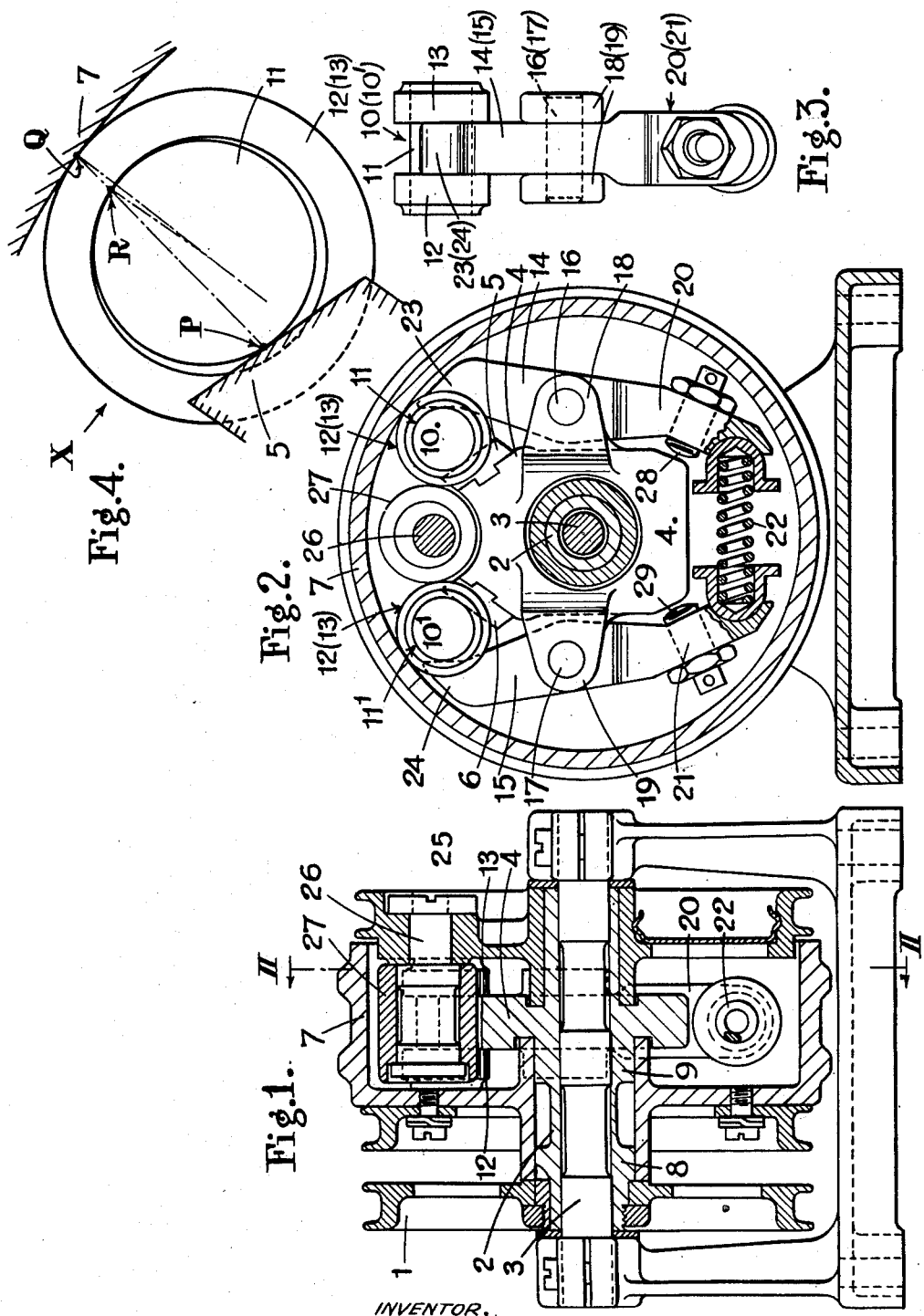
INVENTOR,
BEVAN G. HORSTMANN,
BY Herbert H. Thompson
HIS ATTORNEY.

Patented Dec. 26, 1944

2,365,877

UNITED STATES PATENT OFFICE 2,365,877

JAMMING CLUTCH

Bevan Graham Horstmann, Bath, England, assignor to The Sperry Gyroscope Company, Ltd., Brentford, England Application July 8, 1943, Serial No. 493,853
In Great Britain May 7, 1942

10 Claims. (Cl. 192—44)

This invention relates to free wheel or over-running clutches of the so-called jamming or wedging type, for clutching together a driving and a driven member.

In clutches of this type a jamming unit, or a plurality of jamming units, is disposed between the driving and the driven members and is displaceably carried on one of them so as to have alternative possible positions thereon. In one of these alternative positions the jamming unit is jammed, or wedged, between surfaces on the driving and driven members (or possibly between a surface on one of these members and a brake shoe adapted to engage with the other member) in such a manner as to prevent relative movement in at least one direction between these two members, which are thereby clutched together against relative movement in that direction. If the jamming unit is displaced from this jamming position into a second position available to it on the supporting member, it is no longer wedged between the driving and driven members and no longer opposes relative movement between them.

Jamming clutches of this type can be divided into two classes; in one of these an auxiliary control member is provided to displace the jamming unit from one to another of the positions it can occupy on its support, so as to bring about engagement or disengagement of the jamming unit between the driving and the driven members; in the other class no auxiliary control member is provided for this purpose, and jamming is brought about solely by initial relative movement of the driving and driven elements in one direction (further movement in the same direction being prevented by the consequent displacement of the jamming unit into the jamming position).

A jamming clutch connection between a driving and a driven member may be of the one-way type or of the two-way type. In the latter case two one-way jamming clutches are used, one adapted to lock the driving and the driven members to each other against relative movement in one direction, and the other to lock them together against relative movement in the other direction. In general such two-way clutches must be of the first class, i. e., they must include an auxiliary control member for bringing about engagement or disengagement of the jamming unit between the driving and the driven members.

In jamming clutches of the first class difficulties arise if the jamming unit has to be disengaged from the jamming position when the clutch is under load and the jamming unit is therefore under compression. In previous forms of clutch disengagement of the jamming unit under such conditions necessitated the application of considerable forces by the auxiliary control member and also brought into play high frictional forces at the surfaces of contact between the driving and the driven members and the jamming unit. As a result, excessive wear took place and there was also a tendency for disengagement to take place intermittently with a shuddering effect.

The present invention provides a jamming clutch of improved construction. The novel features of the invention have particular advantages in a jamming clutch of the first class, as they allow an auxiliary control member to effect disengagement of the jamming unit, even under load, by means of light forces, and without forcibly causing slip under load. The same features may, however, be used in jamming clutches of the second class, where no auxiliary control member is present, in which case other, though possibly less important, advantages are obtained.

According to the said invention a free wheel or over-running clutch of the jamming or wedging type hereinbefore described is characterised in that the jamming unit (or each jamming unit when a plurality is employed) comprises a train of two or more elements through which a compression stress is transmitted from element to element to provide the jamming thrust between the driving and driven members, and in that at least those of the said elements which are respectively in contact with the driving and driven members disengage from their jamming position with a rolling motion.

In a preferred form of the invention the driven member of the clutch is a cylindrical drum, within which is the driving element. The jamming unit is adapted to engage, and become jammed between, the inner surface of the cylindrical drum and a cam surface on the driving member. The jamming unit comprises two elements, these being in the form of a pair of coaxial rollers, one internal to the other. The inner roller rests on the cam surface of the driving member and the outer roller rests on the inner cylindrical surface of the driven member. The inner roller may extend through and beyond the outer roller to rest on shoulders on the driving member, the outer roller lying between these shoulders (in which case the cam surface formed on the shoulders is a double one). Alternatively, and preferably, the outer roller may be double or divided, being formed by two equal rollers carried respectively on the two ends of the inner roller, in which case the cam surface of the driving member engages with the central portion of the inner roller. A spring-urged lever forces the inner roller up the cam surface on the driving member of the clutch until the outer roller comes into contact with the inner cylindrical surface of the driven member, so that the jamming unit is ready to become jammed automatically whenever there is any tendency of the driving member to move relatively to the driven member further in the same direction as the jamming unit is urged by the spring.

As has already been stated, the invention affords particular advantages when used as a jamming clutch of the first class (wherein an auxiliary control member effects disengagement). The auxiliary control member may be arranged to strike the outer roller at a point diametrically opposite to that at which the sprung lever acts on the inner roller. If the control member applies a force to the roller in excess of that applied by the sprung lever, the jamming unit will readily be displaced from its jamming position, the outer roller and the inner roller rolling on the inner surface of the drum and on the cam surface of the driving member respectively while also rolling or rocking on each other at their point of mutual contact.

In order that the invention may be readily understood an embodiment thereof will be described in greater detail, by way of example, with the aid of the accompanying drawing wherein:

Figure 1 is a longitudinal section;

Figure 2 is a transverse section on the line II—II of Figure 1;

Figure 3 is an elevation of a lever and a jamming unit referred to later; and

Figure 4 is a diagram to an enlarged scale explaining the action of a jamming unit.

Referring to the drawing, 1 designates the member to be driven. This is shown as a pulley keyed on a tubular shaft 2 adapted to turn on plain bearings on a central fixed shaft 3. The shaft 2 is provided with a flange member 4 on which are fixed two hardened and ground cam pieces 5, 6. These lie within a cylindrical casing or drum 7 concentric with the axis of shaft 3, said drum 7 constituting the driving member of the clutch. In the form shown in Figs. 1-4 the casing 7 is also mounted for rotation about the axis of shaft 3, being carried on plain bearings 8 and 9 on the tubular shaft 2. The clutch of the invention is to serve to clutch together the driven member 1, 2, 4, and the drum 7. Although it has been stated that the member 1 is the driven member and the drum 7 is the driving member, it is clear that the apparatus can be used in the reverse manner with the drum 7 as the driven member and the member 1 as the driving member.

Between the cams 5, 6, and the inner surface of the drum 7 there are located jamming units 10, 10'. Unit 10 consists of an inner roller 11 having two spaced outer roller rings 12, 13 mounted loosely on it (Fig. 3); unit 10' consists of a similar inner roller 11' and two outer rollers 12', 13'. The central portions of the rollers 11, 11' rest on the cams 5, 6 respectively, while the outer rollers 12, 13, 12', 13' overhang the cams. The outer rollers are normally in contact with the inner surface of the drum 7.

The jamming unit 10 is normally resiliently urged to the left as shown in Figs. 2 and 4, which is the direction in which the surface of the cam 5 and the inner surface of the drum 7 converge with the result that the unit as a whole becomes wedged between these two surfaces. In this condition, if there is any tendency for the drum 7 to rotate counterclockwise relatively to the member 4, the jamming unit is thereby urged by frictional forces to move still further into the acute angle formed by the surface of the cam 5 and the inner surface of the drum 7, and therefore to become still more violently wedged as a whole between the two surfaces. Thus the jamming unit 10 will serve as a clutch between the drum 7 and the load member 1, 2, 4, to transmit a counterclockwise torque from the drum 7 to the load member or a clockwise torque from the load member to the drum 7. However, if there is any tendency for the drum 7 to turn clockwise relatively to the load member 4, the jamming unit 10 will not oppose it, or at most will oppose it only by a light frictional torque. In other words, the jamming unit 10 will not transmit an appreciable clockwise torque from the drum 7 to the member 4 and will not transmit an appreciable counterclockwise torque from the member 4 to the drum 7.

The converse conditions hold good with respect to the jamming unit 10', since the cam 6 converges towards the drum surface to the right as seen in Fig. 2. It follows that when both jamming units are present and are in their normal positions—the positions in which they are wedged into the angles between the cams and the drum surface—the drum 7 and the load member 1, 2, 4 are clutched together for movements in either direction and originating in either member.

The term "cam" has been applied to the flat surfaces 5 and 6 since their converging disposition in relation to the inner surface of the drum 7 has the effect of a cam. In place of the surfaces 5 and 6 there may be employed any suitable flat or curved surfaces arranged to form, in combination with the inner surface of the drum, jamming pockets.

In order to urge the jamming units into their normal positions of jamming engagement two rockers 14, 15 are provided pivoted respectively at 16, 17 in lugs 18, 19 on the member 4. These rockers are two-armed levers having tail ends 20, 21 which are urged apart by a compression spring 22; this causes the levers to turn about their pivots 16, 17 until their noses 23, 24 abut against the rollers 11, 11' and urge these up the slopes of the cams 5, 6 into contact with the inner surface of the drum 7.

An auxiliary control member is provided to effect disengagement of either jamming unit as desired. This consists of a member 25 (Figure 1) which is mounted on plain bearings on the sleeve 2 for rotation about the axis thereof. In this member 25 there is fixed a pin 26 upon which is mounted a striker 27. The clutch disabling means or striker 27 is an eccentric whose axis is parallel to the axis of the coaxial driving and driven members. The axis of the eccentric is also parallel to the axis of the respective rollers or jamming units. This striker projects into the space between the jamming units 10, 10'. In the normal position in which the jamming units are in their normal or jamming positions the striker 27 has a very small freedom of movement between the two jamming units.

If the auxiliary control member 25 is turned clockwise as seen in Fig. 2, the striker 27 comes into contact with the outer rollers 12, 13 of the jamming unit and causes these to be displaced clockwise relatively to the load member 1, 2, 4, at the same time tilting the lever arm 14 about its pivot 16 and thereby compressing the spring 22. The jamming unit 10 is thereby forced out of the position of jamming engagement and it is thereafter possible for the load member 1, 2, 4 to turn clockwise relatively to the drum 7, since the jamming unit 10' does not oppose relative movement in this direction. Further clockwise movement of the striker 27 causes the lever 14 to turn far enough to bring an adjustable stop 28 thereon into contact with the member 4. The adjustable stop 28 is initially adjusted into such a position that only a small angular movement of the auxiliary member 25 is possible. Still further clockwise movement of the auxiliary control member 25 causes a thrust to be transmitted through the striker 27, roller 12, lever 14, and stop 28, resulting in a torque on the load member 4. In this way the auxiliary control member 25 becomes effective to drive the driven member. In a similar manner counterclockwise rotation of the auxiliary member 25 first causes the jamming unit 10' to be disengaged, thus freeing the load member 4 from the drum 7, and thereafter causes the lever arm 15 to turn about its pivot 17 until an adjustable stop 29 thereon comes into contact with the load member 4 and thereby transmits a torque to turn the load member. The load member may therefore be turned at any time from the auxiliary control member 25.

The method of actuating the auxiliary control member 25 forms no part of the invention, and various methods of producing relative movement between the control member and the load member 4 may be employed according to the particular purpose to which the invention is put. It will, of course, be appreciated that if the driving member has to operate the load then the auxiliary control member 25 must be free to turn with the load. It will also be appreciated that the auxiliary control member 25 will normally be driven with the load (i. e., unless sufficient resistive torques are applied to cause the jamming units of the clutch to become disengaged), because it is retained in its centralised position with respect to the member 4 (a) by friction at its bearings on the tubular shaft 9, and (b) (if for any reason there should be a tendency for the auxiliary member 25 to be displaced from its centralised position with respect to the driven member 4 by light forces) by pressures imparted to it from the rollers 12 of the jamming unit with which it comes into contact, these forces being due to the action of the spring 22 on the lever 14. Therefore disengagement of the jamming unit must be brought about by relative movement of the load and the member 25, both of which would otherwise turn together.

One of the advantages of the invention can be seen from Fig. 4. Here the inner roller 11 is shown as resting in contact with the cam 5 at the point P; the drum 7 is in contact with the outer roller 12, 13 at the point Q, and the inner roller 11 is in contact with the outer roller 13 at some point such as R. As has already been stated, the outer roller 13 is mounted loosely on the inner roller 11, so that there is an appreciable difference in diameter between the roller 11 and the internal diameter of the roller 12, 13. In Fig. 4 the parts are shown in their jamming position. Suppose that in this condition a counterclockwise torque is imparted to the outer drum 7 and that a corresponding clockwise resistive torque is imparted to the load member 1 and therefore to the cam surface 5. Under these conditions the forces acting to wedge the rollers 11 and 12, 13 between the cam 5 and the drum 7 may be quite high. In spite of this fact the jamming unit 11, 12, 13 of the present invention can be readily disengaged. If the striker unit 27 exerts a pressure against the roller 12, 13 from the left in the direction shown by the arrow X, this causes the roller 12, 13 to roll out of engagement by turning about the point Q as the instantaneous centre and thereby causes the point R on its inner surface to move to the right. The corresponding point R on the inner roller also moves to the right in a rolling movement about the point P. In this way the first stages of the movement by which the two rollers disengage out of their jamming position consists of pure rolling movements at the three points P, R and Q, without slipping. Owing to this feature disengagement under load conditions can be effected readily and smoothly without any tendency of the parts to stick or shudder.

The invention may be applied in several ways. In one form the drum 7 may be fixed instead of being rotatably mounted as shown in the drawing. In such applications the member 25 is the input member or member that drives the load. If the member 25 is not being used to drive the load member 1, 2, 4, the latter is automatically locked to the fixed casing 7. The device is then a form of auto-lock in which a load member can be driven from an input but is automatically locked against movements originating in the load member.

In another form the device may be used in a dual control system of the type described in British Patent Application No. 9183/41. In that case the subordinate input is applied to drive the member 7, and this is normally effective to drive the load member 1, 2, 4 and also the auxiliary control member 25. However, if the latter is actuated, it takes control of the load member 1, 2, 4, irrespective of the manner in which the normal input is turning the drum 7. The device of Fig. 1 is suitable for direct use in such a system, the drum 7 and the auxiliary control unit 25 being provided with pulleys 30, 31, respectively, by which they can be actuated, and the load member 1, 2, 4 being provided with a pulley 32 by which it can actuate a load to be driven. This is in accordance with the principles of the invention of application No. 9183/41.

The invention may also be applied to one-way over-running clutches, as for example if the jamming unit 10 is present and the jamming unit 10' is absent. In that case a drive may be imparted to the load member, 1, 2, 4 from the drum 7 in a counterclockwise direction only, and the load member 4 may free-wheel readily in the counterclockwise direction relative to the drum 7. An auxiliary control member 25 having a striker such as 27 may still be employed to disengage the jamming unit 10 in such a one-way over-running clutch.

The jamming unit of the present invention comprises a train of two elements through which a compression stress is transmitted from the cam 5 to the drum 7 to provide a jamming thrust between the two members to be clutched to each other. The invention, however, is not necessarily limited to the case where only two such members are employed in a train of elements providing the jamming thrust.

I claim:

1. In a clutch mechanism having coaxial driving and driven members, roller means wedgingly mounted between said members having an axis parallel to the axis of the members comprising a first roller situated in engaging relation to one of the members, and a coaxial second roller loosely mounted on said first roller situated in engaging relation to the other of the members.

2. In a clutch mechanism having coaxial driving and driven members, wedging means situated between said members comprising an inner roller having an axis parallel to the axis of the members situated in engaging relation to one of the members, and a pair of axially spaced outer rollers loosely mounted on said first roller and coaxial therewith, said outer rollers being situated in engaging relation to the other of the members.

3. A clutch comprising a rotatable drum having an internal circumferential wall, a shaft situated at the axis of the drum having a plate fixed thereto movable within the drum, a cam surface on said plate, a roller mounted in said drum to contact said cam surface having an axis parallel to the axis of the shaft, a ring loosely encircling said roller mounted to contact the internal circumferential wall of said drum, and yielding means for urging said roller and ring respectively against the cam surface of the plate and the circumferential wall of the drum.

4. A clutch comprising a rotatable drum having an internal circumferential wall, a shaft situated at the axis of the drum having a plate fixed thereto movable within the drum, a cam surface on said plate, a roller mounted in said drum to contact said cam surface having an axis parallel to the axis of the shaft, a pair of rings loosely encircling said roller respectively mounted at the ends of roller to contact the internal circumferential wall of said drum, and spring means for engaging said roller to urge the same into contacting relation to the cam surface and to urge the rings thereon into contacting relation to the circumferential wall of said drum.

5. A clutch comprising a rotatable drum having an internal circumferential wall, a shaft situated at the axis of the drum having a plate fixed thereto movable within the drum, a pair of oppositely disposed cam surfaces on said plate, a first roller mounted in said drum to contact the internal wall of the drum and one of the pair of cam surfaces, a second roller mounted in said drum to contact the internal wall of the drum and the other of the pair of cam surfaces, and yielding means for urging said rollers into contacting relation comprising a pair of oppositely disposed rockers mounted on said plate having a compression spring situated therebetween.

6. A clutch as claimed in claim 5, that includes disabling means for one of the rollers comprising an eccentric situated between the rollers whose axis in the drum is parallel to the axis of the shaft.

7. A clutch as claimed in claim 5, in which stops are provided on the respective rockers to limit the motion of the same relative to the plate.

8. A clutch comprising a rotatable drum having an internal circumferential wall, a shaft situated at the axis of the drum, a cam plate within the drum movable with the shaft, a roller mounted in said drum to contact said cam plate, a ring loosely encircling said roller mounted to contact the internal circumferential wall of the drum, yielding means for urging said roller and ring respectively against the cam plate and internal circumferential wall of the drum, and disabling means operable to render said yielding means ineffective comprising an eccentric mounted in said drum on an axis parallel to both the axis of the shaft and the axis of the ring, said eccentric engaging the surface of the ring.

9. In a clutch mechanism having coaxial driving and driven members, roller means mounted in jamming relation between said members comprising a first roller situated in engaging relation with one of said members and a coaxial second roller loosely mounted on said first roller situated in engaging relation with the other of said members, means for normally urging said rollers into their respective engaging positions, and disabling means for the rollers comprising an eccentric having an axis parallel to the members.

10. In a clutch having driven and driving members, a jamming unit between said members comprising a first roller situated in engaging relation to one of said members, and a coaxial second roller loosely mounted on said first roller situated in engaging relation to the other of said members.

BEVAN GRAHAM HORSTMANN.